(12) United States Patent
Shelton (10) Patent No.: US 7,705,772 B1
(45) Date of Patent: Apr. 27, 2010

(54) TRAFFIC RADAR WITH TARGET DURATION TRACKING

(75) Inventor: Maurice E. Shelton, Buffalo, KS (US)

(73) Assignee: Kustom Signals, Inc., Lenexa, KS (US)

( * ) Notice: Subject to any disclaimer, the term of this patent is extended or adjusted under 35 U.S.C. 154(b) by 0 days.

(21) Appl. No.: 12/356,000

(22) Filed: Jan. 19, 2009

(51) Int. Cl.
*G01S 13/58* (2006.01)

(52) U.S. Cl. ............... 342/104; 342/114; 342/115; 342/116; 342/192; 342/196; 342/179

(58) Field of Classification Search ............... 342/104, 342/108, 111, 114–116, 176, 179, 189, 192, 342/196
See application file for complete search history.

(56) References Cited

U.S. PATENT DOCUMENTS

| | | | |
|---|---|---|---|
| 4,236,140 A | 11/1980 | Aker et al. | |
| 4,335,382 A | 6/1982 | Brown et al. | |
| 4,335,383 A | 6/1982 | Berry | |
| 4,988,994 A | 1/1991 | Loeven | |
| 5,381,155 A | 1/1995 | Gerber | |
| 5,525,996 A * | 6/1996 | Aker et al. | 342/104 |
| 5,528,245 A | 6/1996 | Aker et al. | |
| 5,528,246 A | 6/1996 | Henderson et al. | |
| 5,563,603 A | 10/1996 | Aker et al. | |
| 5,565,871 A | 10/1996 | Aker et al. | |
| 5,570,093 A * | 10/1996 | Aker et al. | 342/104 |
| 5,691,724 A * | 11/1997 | Aker et al. | 342/104 |
| 5,777,575 A * | 7/1998 | Shelton et al. | 342/104 |
| 5,815,092 A | 9/1998 | Gregg, III et al. | |
| 5,912,822 A | 6/1999 | Davis et al. | |
| 5,935,190 A | 8/1999 | Davis et al. | |
| 6,008,752 A | 12/1999 | Husk et al. | |
| 6,023,236 A | 2/2000 | Shelton | |
| 6,501,418 B1 | 6/2002 | Aker | |
| 6,417,796 B1 | 7/2002 | Bowlds | |
| 6,580,386 B1 * | 6/2003 | Aker et al. | 342/104 |
| 6,744,379 B1 | 6/2004 | Aker et al. | |
| 6,831,593 B2 | 12/2004 | Aker et al. | |
| 6,853,314 B1 * | 2/2005 | Aker et al. | 340/936 |
| 7,068,212 B2 * | 6/2006 | Aker et al. | 342/114 |

(Continued)

FOREIGN PATENT DOCUMENTS

ES 2091756 T3 11/1996

OTHER PUBLICATIONS

"Radar Speed Monitoring System", Sato, Y., Vehicle Navigation and Information Systems Conference, 1994 Proceedings, 1994, pp. 89-93.

(Continued)

*Primary Examiner*—John B Sotomayor
(74) *Attorney, Agent, or Firm*—Chase Law Firm, L.C.

(57) ABSTRACT

A traffic radar utilizes digital signal processing (DSP) to determine targets based on signal strength histories. From these histories, a target vehicle having the strongest Doppler return signal is identified and its speed is displayed, and a target vehicle having the highest frequency return signal is identified and its speed is displayed. The traffic radar may also display the relative strength of the strongest return signal and the relative strength of the highest frequency return signal, thereby showing a comparison of the strengths of the return signals from the target vehicles.

9 Claims, 7 Drawing Sheets

U.S. PATENT DOCUMENTS

| | | |
|---|---|---|
| 7,091,901 B2 | 8/2006 | Shelton et al. |
| 2005/0062642 A1* | 3/2005 | Aker et al. ................ 342/104 |
| 2005/0253749 A1* | 11/2005 | Shelton et al. ............. 342/104 |

OTHER PUBLICATIONS

"Millimeter wave safety warning system for in=vehicle signing", Greneker, G., IEEE Aerospace and Electronics Systems Magazine vol. 13 7, Jul. 1998, pp. 7-12.

"Improving on police radar", Fisher, P.D., IEEE Spectrum vol. 29 7, Jul. 1992, pp. 38-43.

"Spread spectrum for commercial communications", Schilling, D.L.; Milstein, L.B.; Pickholtz, R.L.; Kullback, J.;' Miller, F., IEEE Communications Magazine vol. 29 4, Apr. 1991, pp. 66-79.

"35—GHz—Doppler radar for law enforcement agencies in Europe", Westphal, R.; Kessler, A., Microwave Symposium Digest, 1988., IEEE MTT-S International, 1988, pp. 1031-1033 vol. 2.

H.A.W.K. Traffic Safety Radar; Kustom Signals, Inc.; Lenexa, Kansas; pp. 1-4; (342/104), 1995.

* cited by examiner

```
   (162) Tgt. Index      174  185  υ  0  0  0  0  0  0  0  0  0  0
   (164) Tgt. Mag.         6    4  0  0  0  0  0  0  0  0  0  0  0

(212) Tgt. Peak Hist.    174  184  0  0  0  0  0  0  0  0  0  0  0
(214) Tgt. Dura. Hist.    81   13  0  0  0  0  0  0  0  0  0  0  0

(222) Tgt. Peak Hist.    174  185  0  0  0  0  0  0  0  0  0  0  0
(224) Tgt. Dura Hist.     87   17  0  0  0  0  0  0  0  0  0  0  0

(232) Targets         174  185  0  0  0  0  0  0  0  0  0  0  0
(234) Targets Dura.       87   17  0  0  0  0  0  0  0  0  0  0  0
```

(312) Strong Target = 174    (322) Fastest Target = 185
(332) Strong Speed = 75      (336) Fastest Speed = 80
(334) Strong SNR = 87        (338) Fastest SNR = 17

Fig. 11

TRAFFIC RADAR WITH TARGET DURATION TRACKING

This invention relates to improvements in traffic radar systems for law enforcement and related applications in which the speed of a target vehicle, or several such vehicles in the range of the radar, is detected from a stationary or moving transmitter platform and, in particular, to a traffic radar system which determines and displays information concerning the signal strength of selected targets.

BACKGROUND OF THE INVENTION

Traffic radar systems utilizing digital signal processing (DSP) have been in use for a number of years. Such a DSP radar is disclosed, for example, in U.S. Pat. No. 5,528,246 ("'246") owned by Kustom Signals, Inc. In the '246 patent, the radar transforms target return information into the frequency domain and compares the magnitude of a tested target bin to the magnitude of a moving average of a number of bins surrounding the target bin. Typically, a target is qualified if the tested peak is greater than a threshold significantly higher in magnitude than a surrounding moving average. In this manner of processing, radar return signals from very strong targets qualify at the same time as much weaker return signals as long as the returns are above the target threshold level. If too low a threshold level is chosen, noise signals may be processed as targets. If too high a threshold is chosen, a low level target may not be found. After initial processing, information concerning the signal-to-noise levels of the respective bins is not retained.

It would be advantageous in traffic radar systems to determine targets such that strong targets with high magnitude returns qualify very quickly, whereas weak, but consistent, targets qualify more slowly. Another desired improvement in a traffic radar system would be to display signal strength information to the operator regarding the target being tracked, either the accumulated signal-to-noise ratio or the instantaneous signal strength. Capabilities of an improved system could include creating a target signal history for each target, validating the target based on its signal history, correlating the target with other targets in the operator's field of view, and displaying the magnitude of the target signal in association with the target's speed.

SUMMARY OF THE INVENTION

In an embodiment of the present invention, the aforesaid is addressed by providing a traffic radar utilizing digital signal processing (DSP) to determine targets based on signal strength history. The DSP digitally samples and transforms the Doppler return signals to frequency bins by the fast Fourier transform (FFT) algorithm. A variable array of current target peaks is created by comparing the magnitude of a particular bin to a weighted moving average threshold. When a bin has been determined to be a target peak, a calculation is made to determine the relative strength of the target peak. This relative strength value is stored in a separate variable array, and sequentially associated with the array of current target peaks.

In another aspect of the invention, improved target tracking provides a history of signal-to-noise ratio values kept to form a running accumulated signal-to-noise array.

In still another aspect of the invention, a target peak found to be valid may be displayed as a speed when the accumulated signal-to-noise ratio is greater than a predetermined threshold.

In yet another aspect of the invention, the accumulated strength of each target (strongest or fastest) is displayed to enhance the operator's correlation of the radar system's displayed targets with the targets in his field of view. Preferably, this relative speed information is displayed in bar graphs of similar readout so that the operator can visually correlate vehicle speed and return signal strength utilizing, for example, a bar graph adjacent each digital display of an associated target's speed.

Other advantages of this invention will become apparent from the following description taken in connection with the accompanying drawings, wherein is set forth by way of illustration and example, an embodiment of the present invention.

DETAILED DESCRIPTION

Figure 1:
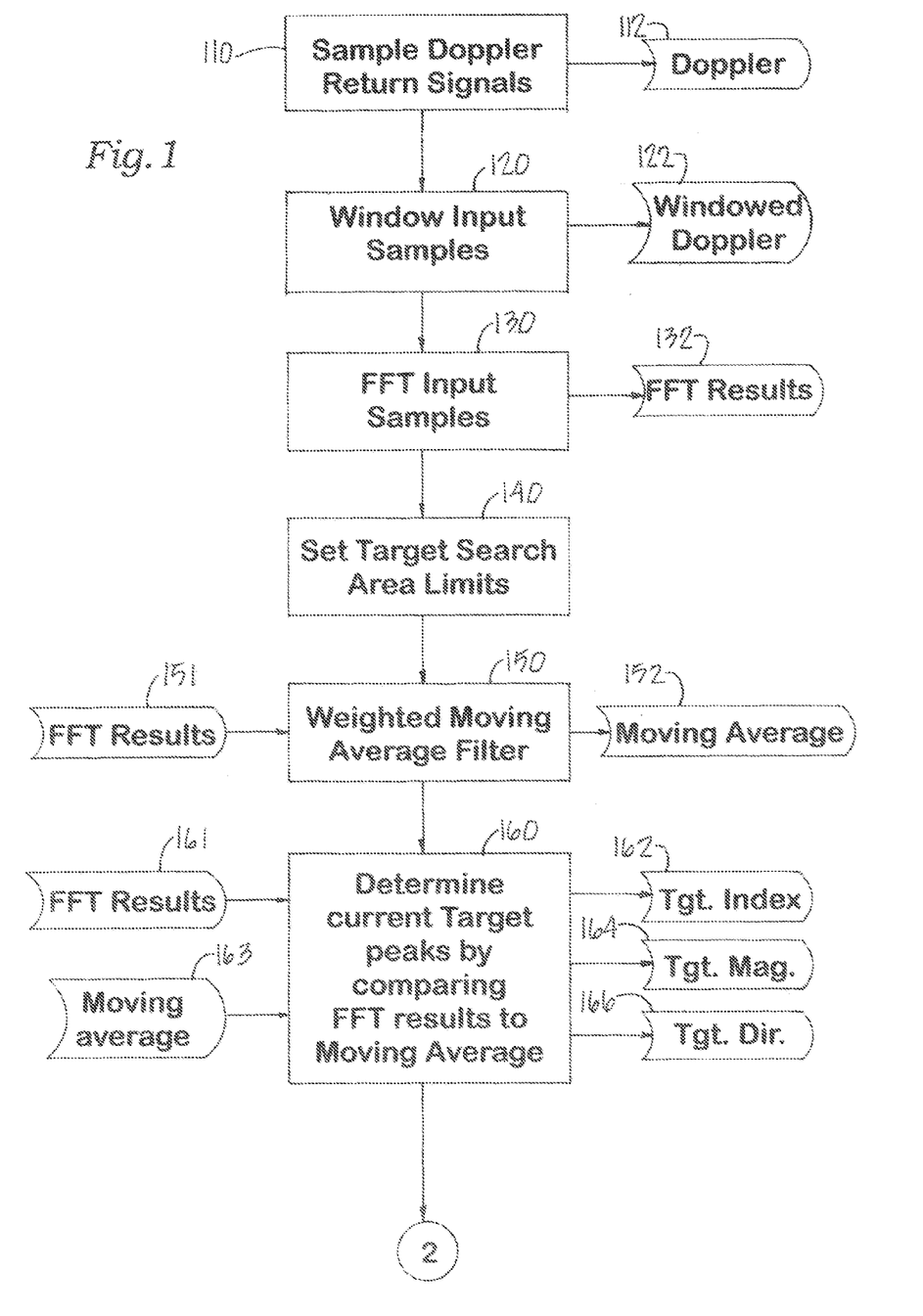
FIG. 1 is flow chart of the DSP software routines of the radar system that gather the input Doppler samples and perform moving average calculations.
Figure 2:
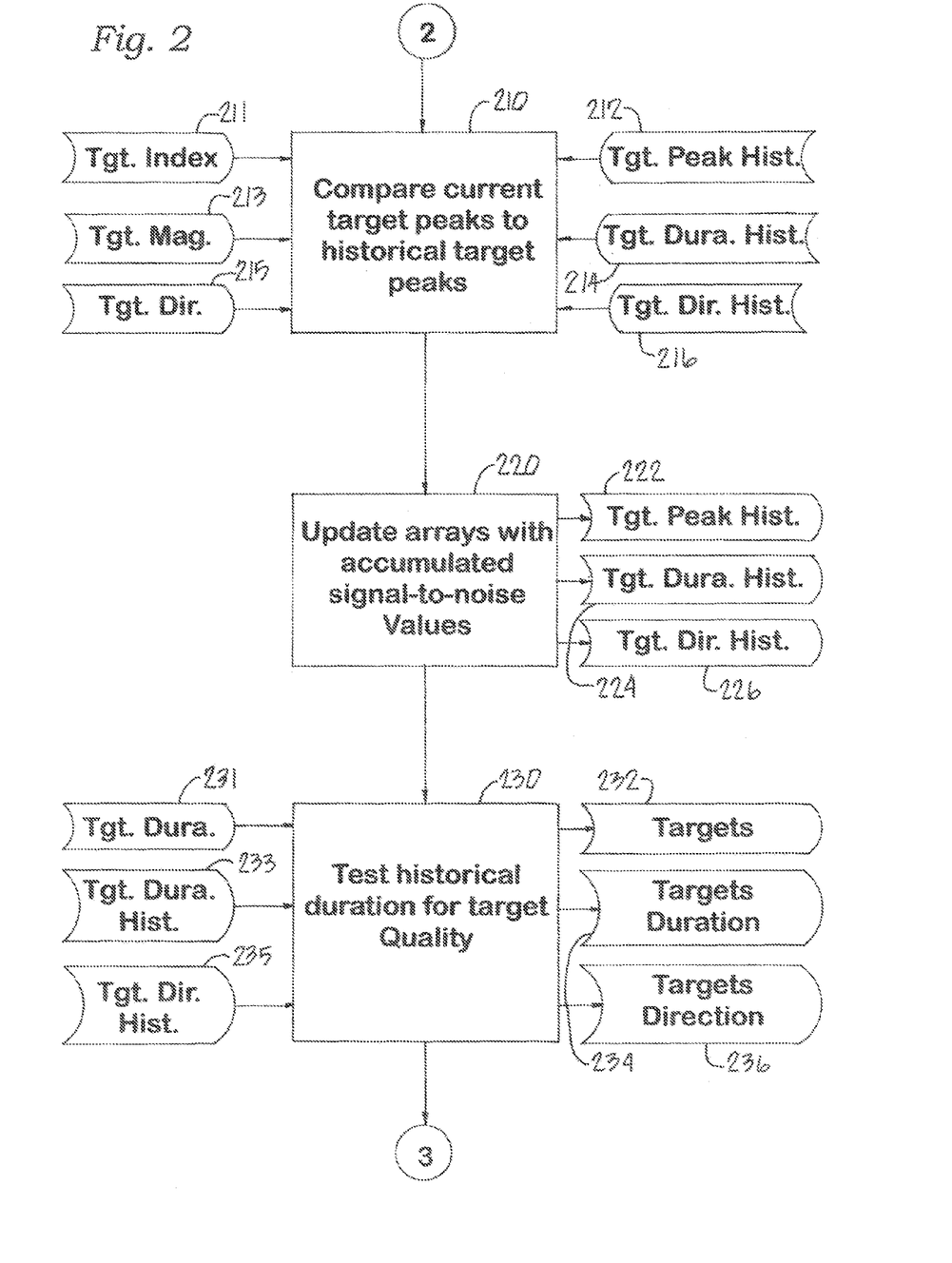
FIG. 2 is a flow chart of the target qualifying routines.
Figure 3:
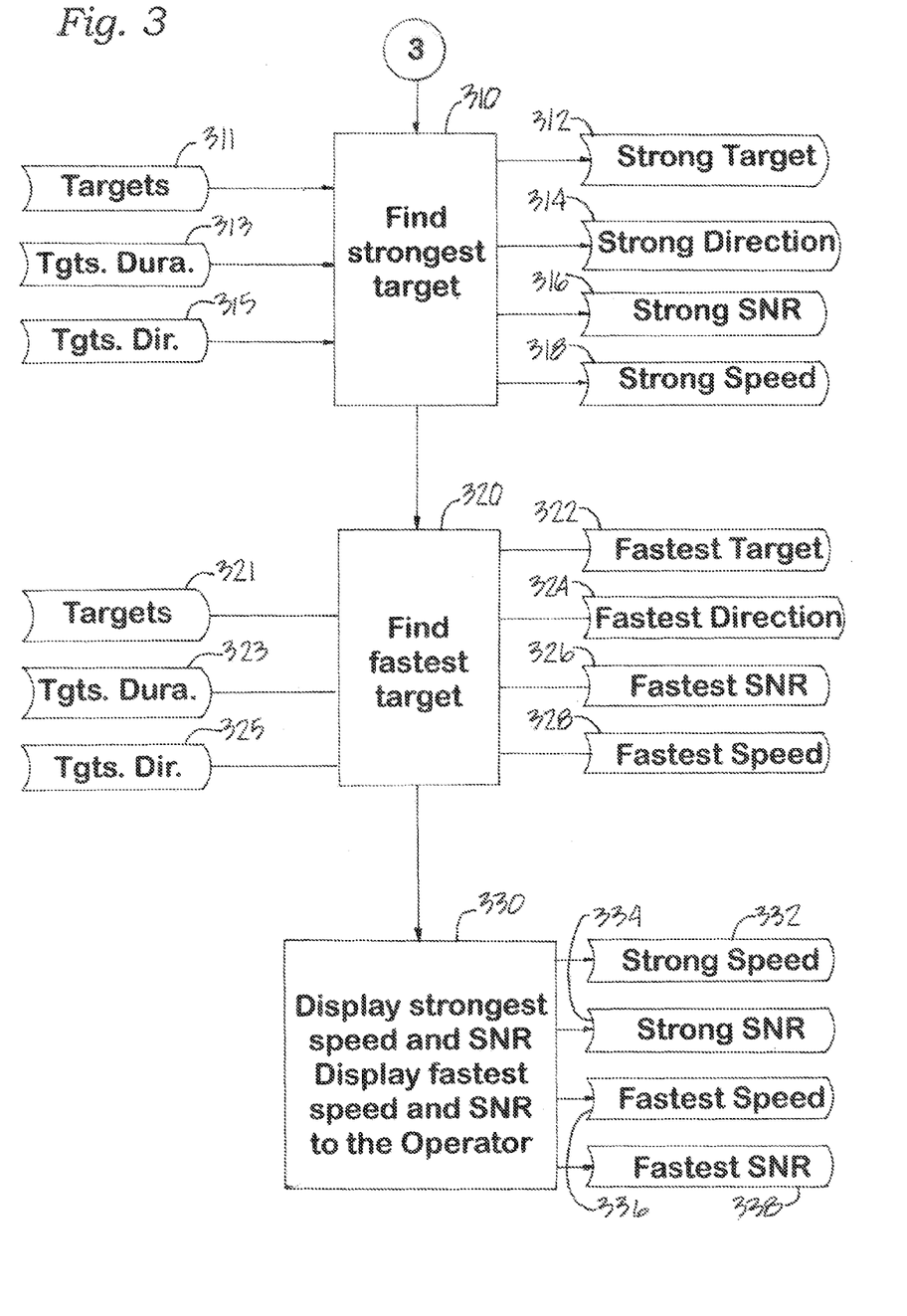
FIG. 3 is a flow chart of the DSP software routine for speed calculations and displaying the signal-to-noise ratio (SNR) of the selected targets.
Figure 6:
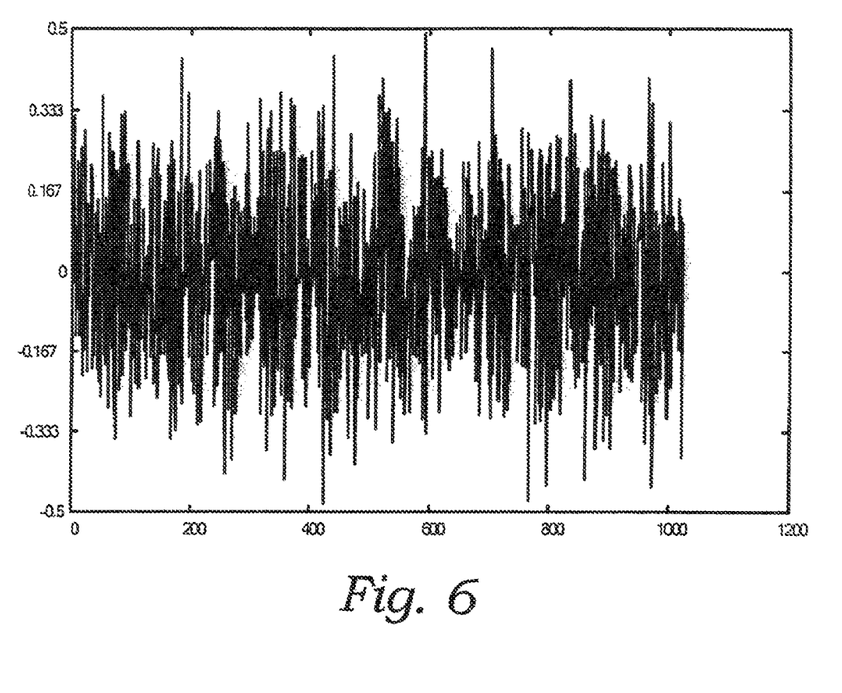
FIGS. 6 and 7 illustrate Doppler and windowed Doppler waveforms respectively.

Turning more particularly to the drawings, FIGS. 1-3 depict a flowchart showing processing by the DSP software of the radar system of the present invention in response to input from the received Doppler signals through a moving average routine. The DSP software gathers analog input data at Block 110, converts the data from analog-to-digital and stores this digital data in a Doppler memory array 112. In a standard radar system this could be a single channel signal stream from a mixer signal path. In a preferred embodiment of a directional radar system, this may be a dual channel of two separate signals from the I/Q mixer signal path. For example, in the preferred embodiment, 1024 time domain samples for each signal channel are stored. (FIG. 6 shows an example of Doppler input samples in memory array 112.)

Figure 7:
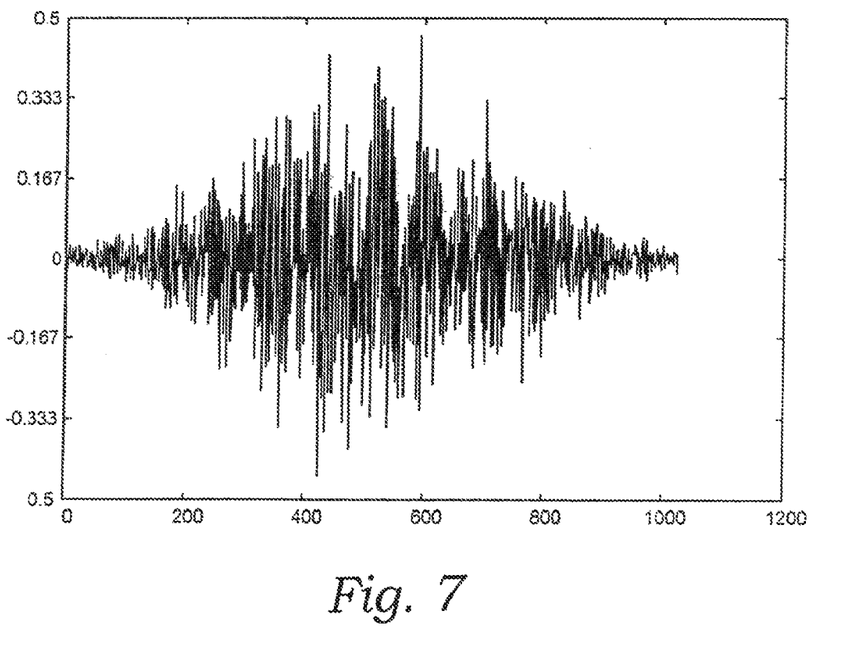
Figure 8:
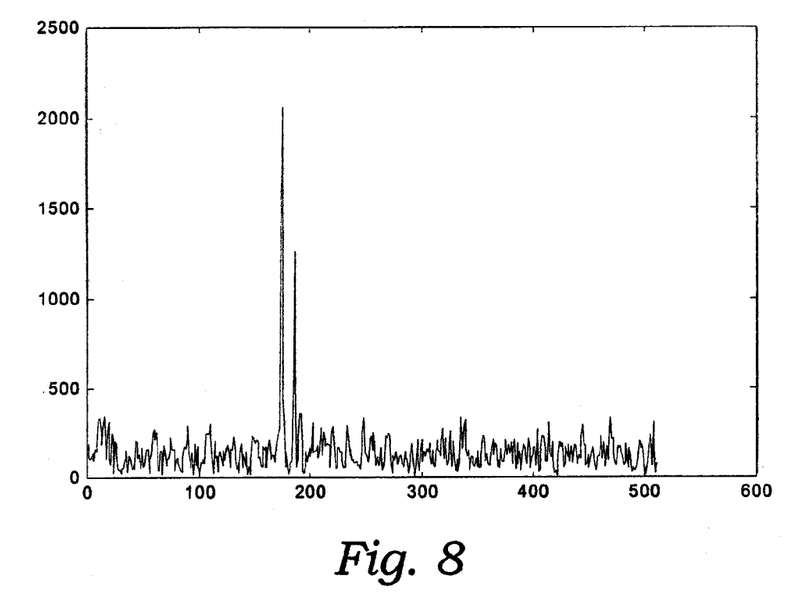
FIG. 8 shows a frequency spectrum resulting from a fast Fourier transform.

To reduce the end effect of sampling discontinuities, a windowing function may be performed on the Doppler array at Block 120. The results of the windowing function may be stored in bit-reverse address form in memory array Windowed Doppler 122. FIG. 7 shows an example of a windowed Doppler array. This windowed Doppler array, along with a constants table of sine and cosine values, becomes the input data for the frequency transformation routine FFT, Block 130. The output from the FFT routine is the transformed frequency domain results FFT_Results, Block 132. In the embodiment illustrated, these FFT results are stored in 512 bins with each bin represented by real and imaginary components. FIG. 8 shows an example of the FFT_Results array. The lower and upper bin limit area, in which to make the target search is set at 140.

Figure 9:
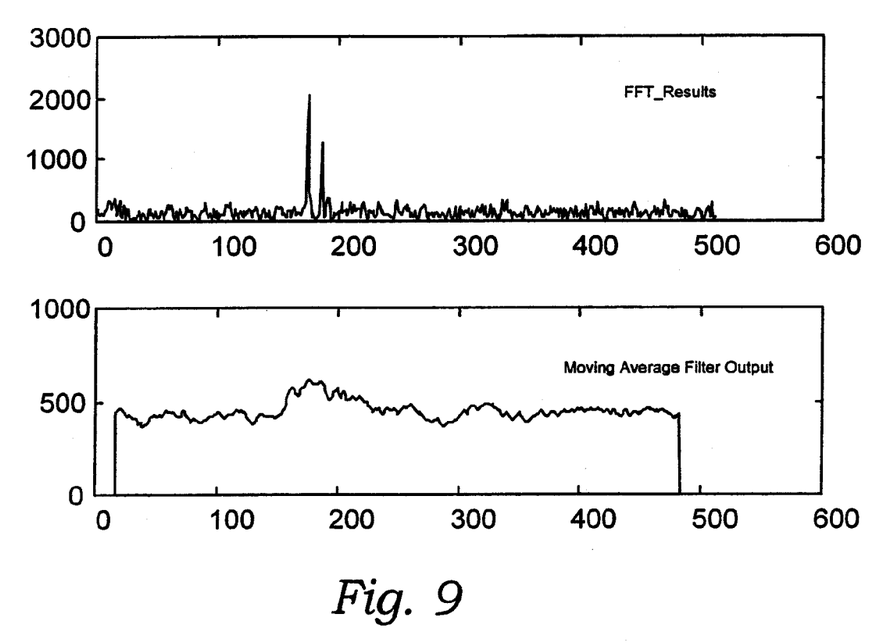
FIG. 9 shows a frequency spectrum resulting from a moving average target search routine.

In the preferred embodiment, the area of the moving average filter is 33 bins, with the center bin and the two adjacent bins on each side of the center bin not used in the average calculation (Block 150). An example of the arrays from the Target Moving Average routine is shown in FIG. 9.

Figure 10:
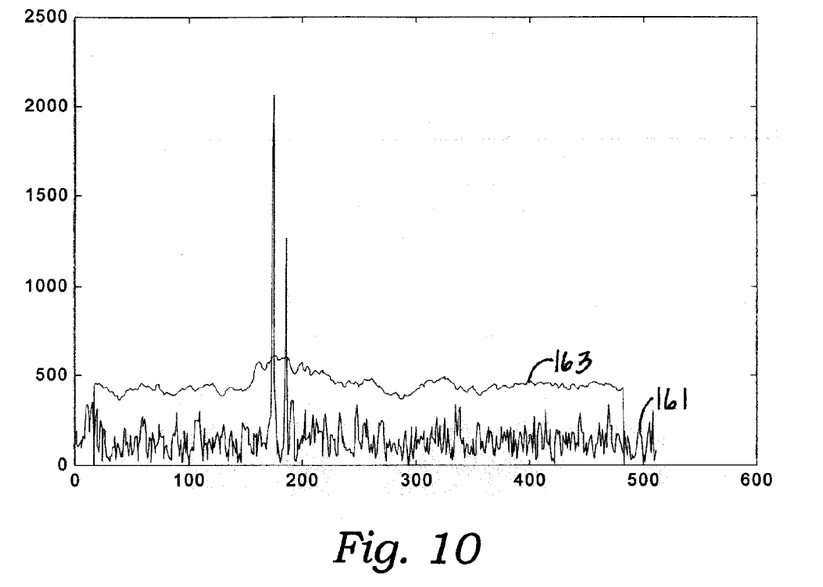
FIG. 10 shows a comparison of the two arrays of FIGS. 8 and 9 (FFT_Results with weighted moving average overlay).
Figure 11:
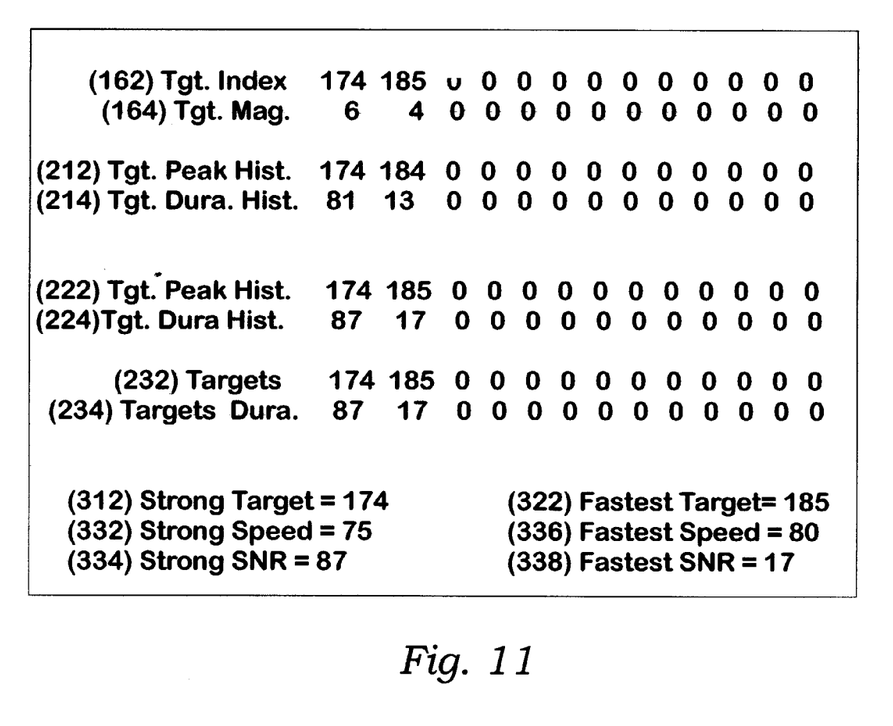
FIG. 11 is an exemplary listing of the two target arrays.

The DSP routine determines current target peaks at Block 160. First, the magnitudes of the elements in the FFT_Results 161 are processed using a second order slope derivative method to determine bin maxima. The magnitude of these bin maxima may be compared to the magnitude of the associated bin in the moving average array 163. The comparison of the two arrays is shown in FIG. 10. If the test bin is larger than the moving average bin, the index of the bin is stored in memory array Tgt_Index 162, and the signal-to-noise ratio may then be calculated from (test bin/moving average) and stored in memory array Tgt_Mag 164, and the target direction may be stored in memory array Tgt_Dir 166. In the example shown in FIG. 10, bins 174 and 185 qualify as current target peaks. At this point the elements of the three memory arrays 162, 164 and 166 are sequentially associated together. FIG. 11 shows an example listing of arrays 162 and 164. For clarity the directional arrays are not shown in FIG. 11.

FIG. 2 is a flowchart of the DSP software through the target qualifying routines. Each element Tgt_Index 211 of the current target bin array may be checked at Block 210 for a matching element from a recent history array Tgt_Peak_Hist 212. During this check for a matching element, a margin may be given to account for slight variances in target speed over time. If a match is found within this tolerance, then the target direction of the current test target Tgt_Dir 215 may be compared to the direction of the target in history array Tgt_Dir_Hist 216. For elements that were found to match, the historical signal-to-noise ratio array Tgt_Dura_Hist 224 is updated at Block 220 to the accumulated sum of the current target signal-to-noise element Tgt_Mag 213 and the historical signal-to-noise element Tgt_Dura_Hist 214. When the update is complete at Block 220 the associated historical arrays Tgt_Peak_Hist 222, Tgt_Dura Hist 224, and Tgt_Dir Hist 226 have been updated and are in order of the current targets' largest to smallest magnitude. FIG. 11 shows an example of the arrays before and after updating.

At Block 230 each element of the accumulated signal-to-noise array Tgt_Dura_Hist 233 is checked to determine if the level has reached the threshold of a qualified target. If the element is above the target quality threshold, the associated elements from the arrays Tgt_Peak_Hist 231, Tgt_Dura_Hist 233 and Tgt_Dir_Hist 235 may be copied to the target qualified arrays Targets 232, Targets_Dura 234 and Targets_Direction 236 respectfully. This provides improved signal tracking and the ability to qualify returns with a high magnitude quickly, as the signal-to-noise accumulation reaches the target quality threshold. Accordingly, weak targets qualify more slowly due to the slower accumulation of the signal-to-noise values.

When the processing at Block 230 is complete the associated qualified target arrays Targets 232, Targets_Dura 234, and Targets_Direction 236 are in order of the current targets from the largest to the smallest magnitude. FIG. 11 sets forth an example of listings of arrays 232 and 234 to show qualified targets as described above.

FIG. 3 shows the DSP software for the speed calculations and display routines. First, variables for the strongest target are determined at Block 310. Typically, since the qualified target elements are listed in order of largest to smallest magnitude, the strongest target would be the represented by the first elements in the qualified target arrays. However, the radar system may have target restrictions such as target directionality. In cases such as this, the strongest target may be the first target in the qualified target arrays that meets this restriction. When the strongest target is determined, the associated element from the array Targets 311 may be copied into memory variable Strong_Target 312, the associated element from array Targets_Direction 315 may be copied into memory variable Strong Direction 314, and the associated element from array Targets_Dura 313 may be copied into memory variable Strong_SNR 316. The variable Strong_Target 312 now contains the number of the frequency bin for the strongest target. From this bin number the strongest target speed based on the units of measure set for the radar system may be calculated and then stored in memory variable Strong_Speed 318. In the preferred embodiment, the units of measure may be miles per hour (mph) or kilometers per hour (km/h). The variable Strong_SNR 316 now contains the accumulated signal-to-noise ratio for the strongest target speed.

The DSP software at Block 320 determines the fastest target variables. Typically, the qualified targets array Targets 321 is searched and the fastest target is represented by the highest value element in this array, but it should be understood that the radar system may have target restrictions such as target directionality. In such case the fastest target may be the highest frequency target in the qualified target arrays that meets this restriction. When the fastest target is determined, the associated element from the array Targets 321 is copied into memory variable Fastest_Target 322, the associated element from array Targets_Direction 325 is copied into memory variable Fastest Direction 324, and the associated element from array Targets_Dura 323 is copied into memory variable Fastest_SNR 326. The variable Fastest_Target 322 now contains the number of the frequency bin for the fastest target. From this bin number the software calculates the fastest target speed based on the units of measure set for the radar system. The calculated speed is then stored in a memory variable Fastest Speed 328 in miles per hour (mph) or kilometers per hour (km/h), for example. The variable Fastest_SNR 326 now contains the accumulated signal-to-noise ratio for the fastest target speed.

Software Block 330 displays the strongest and fastest target information to the radar system operator. The radar system display driven by block 330 may comprise a graphical LCD type illustrated in FIG. 4, which shows a front panel display 400 and associated controls. The display 400 shown is a programmable liquid crystal display (LCD) such as an Optrex F-51852 transflective monochrome-graphic module having, for example, a 128×64 dot format. The module 400 has a display area 410 and indicates the active radar antenna in use (FRONT) and displays a direction indicator 412 which, in the illustrated example, indicates an oncoming target (closing on the police car). A primary target speed area 414 displays the speed of the strongest target vehicle in stationary and moving modes. A second target speed area 416 displays the speed of the fastest target, and the speed of the patrol car is displayed in the patrol area 418 therebelow. Indicators 419 show the mode of operation of each antenna.

Figure 4:
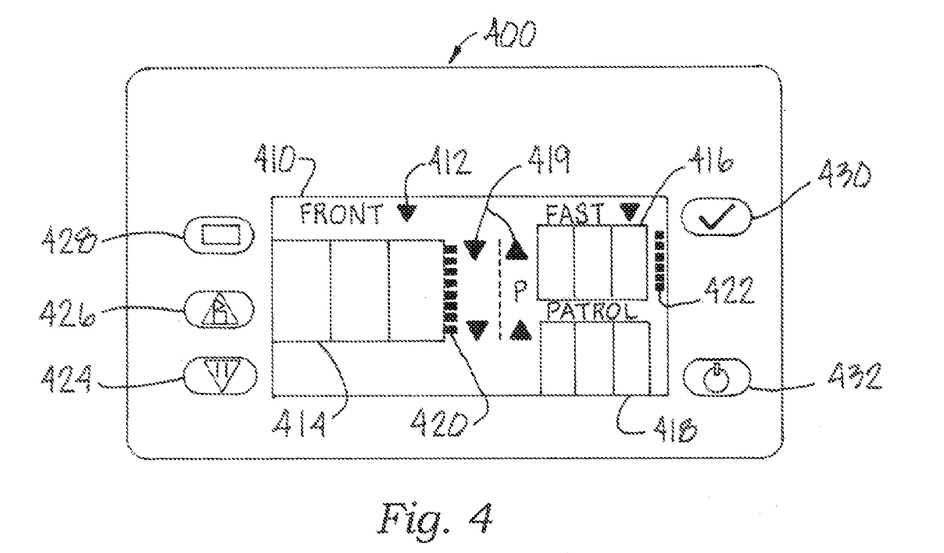
FIG. 4 is an example of a front panel display and controls.

A target signal traffic bar which, in the illustrated embodiment, has eight segments, for example, is shown at 420 alongside the display 414, and a similar six-segment tracking bar 422 for the fastest target is alongside the FAST area 416. Other features may include a hold switch 424 used to toggle the microwave transmitter on and off, a lock/release switch 426 which alternately locks and releases the target and patrol speeds, enter switch 428 for placing the unit in the menu screen, test switch 430 for initiating the display and internal self-test and tuning fork test mode, and power switch 432 for power on/off.

Figure 5:
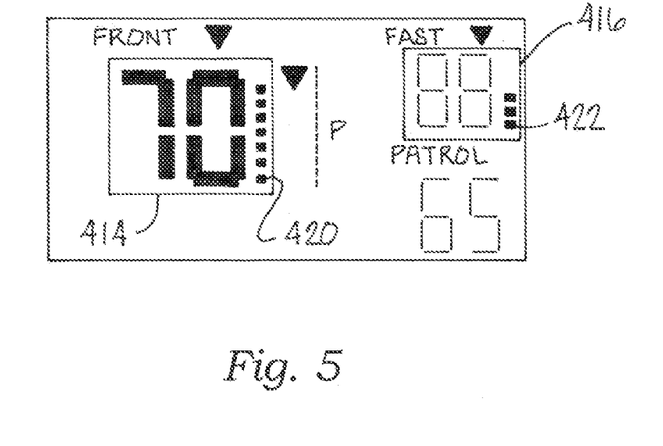
FIG. 5 is a simplified view illustrating the display in operation, showing the speeds of the strongest and fastest targets and respective accumulated signal-to-noise ratios.

FIG. 5 shows a simplified, detailed view of the speed display. The strongest target speed value Strong_Speed 332 is, for example, displayed in numeric form at display window 414 and the accumulated strongest target signal-to-noise ratio Strong_SNR 334 is scaled and displayed in bar graph form alongside the strongest target speed display by the target signal tracking bar 420. In the example shown, the speed in display window 414 is 70 mph and the vertical bar graph 420 shows seven blocks and thus indicates a relatively high accumulation of Doppler return. The fastest target speed value Fastest Speed 336 is displayed to the right in window 416 of the LCD in numeric form (80 mph) in the illustrated embodiment and the accumulated fastest target signal-to-noise ratio Fastest_SNR 338 is scaled and displayed in bar graph form by tracking bar 422 alongside the fastest target speed display. The three segments illustrated show in this example that the fastest vehicle has a lesser accumulation of Doppler return. FIG. 4 shows an example of a preferred display, it being appreciated that other types of displays which provide speed and strength information may be employed as desired. FIG. 11 shows the determination of the target speed variables 312, 322, 332, 336, 334 and 338 as described above.

In a typical speed enforcement application, a police officer directs the traffic radar at moving vehicles which, in the present example, are assumed to comprise oncoming traffic comprising several vehicles. The radar of the present invention determines the speed of the fastest oncoming vehicle, and the speed of the oncoming vehicle that presents the strongest target. For example, referring to FIG. 5, the display for the strongest speed indicates 70 miles per hour and the display for the fastest speed indicates 80 miles per hour. In addition, the display 414 (strongest speed) shows that the corresponding oncoming vehicle is either relatively close or comprises a target (such as a large truck) that presents a large surface area as indicated by the seven segments 420 of the tracking bar which, in the illustrated embodiment, displays a maximum of eight segments. In contrast, the six-segment tracking bar 422 for the fastest target vehicle displays three segments thereof, clearly indicating that it is likely the more distant target. The officer, therefore, is instantly advised of the probable relative positions of the two vehicles, as well as the speed of each vehicle. In the present invention, the tracking continues as the target vehicles close on the patrol car and both the speed display and the tracking bars remain active and continuously update the officer regarding both the speed and relative radar return strength of the two vehicles. Therefore, the officer is advised of the relative positions of the two target vehicles as well as their speeds.

From the foregoing it may be appreciated that, at a glance, the officer may read the speed of both the strongest and the fastest target vehicles. Additionally, as the strength of each target radar return is readily available to the officer in the form of a bar graph or other strength indicator, the officer can with confidence be certain as to the accuracy of the displayed speeds and affirm his or her observations. Alternatively, if desired, the signal strength may be displayed by other indicia or various colors to indicate relative signal strength.

It should be understood that while certain forms of this invention have been illustrated and described, it is not limited thereto except insofar as such limitations are included in the following claims.

Having thus described the invention, what is claimed as new and desired to be secured by Letters Patent is as follows:

1. In a traffic radar, a method of tracking and validating a target from Doppler return information comprising:
    (a) receiving Doppler return information containing at least one return signal derived from a moving target, and presenting said information as digital data,
    (b) transforming said data into the frequency domain to provide a spectrum that includes frequency components corresponding to Doppler return signals contained in said information,
    (c) storing said frequency components in memory,
    (d) identifying a peak magnitude of each component that exceeds a predetermined threshold to thereby identify current target peaks,
    (e) comparing said current target peaks with previously found target peaks and accumulating their magnitudes to provide a target history for each of said components,
    (f) from said target histories, identifying a target which has the strongest Doppler return signal, and determining the speed thereof,
    (g) from said target histories, identifying a target that has the highest frequency return signal, and determining the speed thereof, and
    (h) displaying either or both of the determined speeds.

2. The method as claimed in claim 1, further comprising the step of displaying the relative strength of the strongest return signal, and displaying the relative strength of the highest frequency return signal, thereby showing a comparison of the strengths of the return signals from the target vehicles.

3. In a traffic radar, a method of tracking and validating a target from Doppler return information comprising:
    (a) receiving Doppler return information containing at least one return signal derived from a moving target, and presenting said information as digital data,
    (b) transforming said data into the frequency domain to provide a spectrum that includes frequency components corresponding to Doppler return signals contained in said information,
    (c) storing said frequency components in memory,
    (d) conducting a moving average comparison of said components in memory to identify a peak magnitude of each component that exceeds a predetermined threshold to thereby identify current target peaks,
    (e) comparing said current target peaks with previously found target peaks and accumulating their magnitudes to provide a target history for each of said components,
    (f) from said target histories, identifying a target which has the strongest Doppler return signal, and calculating the speed thereof,
    (g) from said target histories, identifying a target that has the highest frequency return signal, and calculating the speed thereof, and
    (h) displaying either or both of the determined speeds.

4. The method as claimed in claim 3, further comprising the step of displaying the relative strength of the strongest return signal, and displaying the relative strength of the highest frequency return signal, thereby showing a comparison of the strengths of the return signals from the target vehicles.

5. A method of processing Doppler return information in a traffic radar comprising the steps of:
    (a) receiving Doppler return information containing at least one return signal derived from a target vehicle, and presenting said information as digital data,
    (b) transforming said digital data into the frequency domain to provide an input spectrum that includes frequency components corresponding to Doppler return signals contained in said information, (c) storing said frequency components in a memory, (d) determining a peak magnitude of each component in memory that exceeds a predetermined threshold to thereby identify current target peaks, (e) comparing said current target peaks with previously found target peaks and accumulating their magnitudes to provide a target history for each of said components, (f) from said target histories, identifying a target which has the strongest Doppler return signal, and calculating the speed thereof, (g) from said target histories, identifying a target that has the highest frequency return signal, and calculating the speed thereof, (h) displaying either or both of the calculated speeds, and (i) displaying information relating to the signal strength of either or both of the displayed speeds.

6. The method as claimed in claim 5, wherein said step (i) includes displaying the relative strength of the strongest return signal, and displaying the relative strength of the highest frequency return signal, thereby showing a comparison of the strengths of the return signals from the target vehicles.

7. The method as claimed in claim 5, wherein said step (d) includes comparing the magnitude of frequency bins within said input spectrum to a weighted moving average thereof, identifying magnitudes greater than said weighted moving average as target peak bins, and comparing the magnitude of each of said bins to said weighted moving average to determine a signal-to-noise ratio therefor.

8. In a traffic radar, apparatus for processing and displaying Doppler return information comprising:

(a) means for receiving Doppler return information containing at least one return signal derived from a moving target, and for presenting said information as digital data, (b) means for transforming said data into the frequency domain to provide a spectrum that includes frequency components corresponding to Doppler return signals contained in said information, (c) means for storing said frequency components in memory, (d) means for determining current target peak signals based on moving average comparisons, (e) means for accumulating and storing history arrays of respective signal-to-noise ratios of said target peak signals, (f) means for providing a list of qualified targets based on said history arrays, (g) means for calculating the speed of the qualified target which has the strongest Doppler return signal, (h) means for calculating the speed of the qualified target which has the highest frequency Doppler return signal, (i) a first display responsive to said strongest qualified target for displaying information relating to the signal strength of the strongest target, and (j) a second display responsive to said highest frequency qualified target for displaying information relating to the signal strength of the fastest target.

9. Apparatus as claimed in claim 8, further comprising a first target signal traffic bar graph associated with said first display for indicating the relative signal strength of said strongest target, and a second target signal traffic bar graph associated with said second display for indicating the relative strength of said fastest target, whereby the operator can visually correlate vehicle speed and return signal strength.

* * * * *